Oct. 4, 1960 J. SIMPSON 2,954,585
CROWN CAP LINING MACHINE
Filed Aug. 3, 1955 12 Sheets-Sheet 9

INVENTOR
J. Simpson
BY
Mason, Porter, Diller & Stewart
ATTORNEYS

Oct. 4, 1960

J. SIMPSON 2,954,585

CROWN CAP LINING MACHINE

Filed Aug. 3, 1955

INVENTOR
J. Simpson

BY
Mason, Porter, Diller & Stewart
ATTORNEYS

Oct. 4, 1960

J. SIMPSON

2,954,585

CROWN CAP LINING MACHINE

Filed Aug. 3, 1955

INVENTOR
J. Simpson

BY
Mason, Porter, Diller & Stewart
ATTORNEYS

United States Patent Office 2,954,585
Patented Oct. 4, 1960

2,954,585

CROWN CAP LINING MACHINE

Justin Simpson, Elmhurst, Ill., assignor to Continental Can Company, Inc., New York, N.Y., a corporation of New York Filed Aug. 3, 1955, Ser. No. 526,197

10 Claims. (Cl. 18—20)

The well known crown caps used extensively on liquid-containing bottles are provided with yieldable liners to seal against the lips of the bottle necks. In recent years, thermo-setting plastic has been employed to a large extent for the cap liners, and apparatuses have been designed for depositing blobs of the plastic in the caps, shaping these blobs into liner form and curing the liners. Such apparatuses, however, have not been as rapid and efficient as could be desired, and hence there is a demand for a truly successful machine which will more rapidly line the caps and cure the liners, will impart precision thickness to the liners, and may be continuously operated for long periods without appreciable interruption. The present invention supplies this need.

Feeding means is employed for feeding a succession of unlined caps along a horizontal path, plastic-discharge means is provided over this path for depositing a quantity of uncured plastic in each cap, and a vertical-axis turret is employed to which the plastic containing caps are conveyed by said feeding means. The turret carries peripherally located circumferentially spaced clamps into which the plastic containing caps are fed successively, each of said clamps having upper and lower relatively movable clamping members, the uppermost of which constitutes a die for shaping the cap contained plastic into liner form upon closing of the clamp. The upper and lower clamping members then coact to clamp the lined cap to the turret for unerring travel with said turret. During this travel, heat is applied to cure the cap liners, and the caps with their cured liners are finally discharged as the clamps are successively opened. Each clamp remains open only sufficiently long to receive the next plastic containing cap and then again closes to repeat its function.

While the principal object of the invention has been to provide a novel and efficient machine of the general form above briefly explained, the attainment of this object has depended largely upon the fulfillment of a number of ancillary objects.

One object has been to provide a novel and effective operating means for the movable member of each of the above mentioned clamps, including a vertical turret carried plunger connected at its upper end with said movable member, a rotatable stub carried by and disposed radially of the turret under said plunger, a crank pin within said stub, a connecting rod connecting this crank pin with the lower end of the aforesaid plunger, and lateral arms on the outer end of said stub for coaction with relatively stationary abutments to turn said stub in clamp opening and clamp closing directions.

Another object has been to mount the fixed member or die of the clamp in a novel detachable manner and to provide the mounting means with novel provision for guiding a stripper operating stem and holding it against rotation. The stripper is provided to force the lined cap from engagement with the die, and its stem has a lateral projection cooperable with stationarily mounted means to effect stripper raising and lowering. It is therefore necessary that said stem be held against turning in order that said lateral projection may not move to an inoperative position, and the invention fulfills this requirement.

Yet another object has been to provide for effective temperature control in order to insure the desired curing of the liners. The heat supplying means is preferably in the form of upper and lower gas or similar burners for directing flame against the upper and lower members of the clamp, and thermostats are provided for controlling the fuel valves of said burners, said thermostats being mounted on the turret and having feeler portions extending to said upper and lower members of the clamp. These feeler portions preferably extend into sockets of the upper and lower clamp members and as one of these members must be moved to and from clamp open position, another object has been to make novel provision for allowing the feeler portion associated with this movable clamp member to move vertically with the same.

A further object has been to embody a peripherally pocketed feed turret in the cap feeding means and to make novel provision for stopping the machine in case a cap should become jammed in any of the turret pockets. An arcuate track is provided at the periphery of the feed turret to hold the caps against radial displacement, and hold down means is employed over said turret to hold the caps against upward displacement. Any cap jamming will occur at the initial end of the aforesaid arcuate track and a jammed cap will exert upward pressure upon the aforesaid hold down means. The invention therefore mounts at least a portion of this hold down means for upward yielding under the pressure exerted by a jammed cap and provides for utilizing this upward yielding to stop the machine.

A still further object has been to embody an inching means in the machine to allow turning of the drive shaft by hand when desired, and to make novel provision whereby this inching means cannot be connected to said drive shaft until a switch for the machine driving motor has been opened. The drive shaft is driven through a clutch of a type which will "kick out" or disengage upon overload; and a motor stopping switch is so associated with an element of said clutch as to be opened when clutch disengagement occurs, and the invention provides manually releasable means for normally locking the aforesaid inching means in idle position, and means for opening the aforesaid switch whenever said locking means is released.

The above mentioned clutch is belt connected to the machine driving motor, and a still further object has been to provide novel means for adjustably mounting said motor for belt-tightening whenever required.

With the above and other objects in view that will hereinafter appear, the nature of the invention will be more clearly understood by reference to the following detailed description, the appended claims and the several views illustrated in the accompanying drawings.

In the drawings:

Figure 7 is viewed as indicated by the arrow A of Figure 6.

GENERAL EXPLANATION

Figure 1:
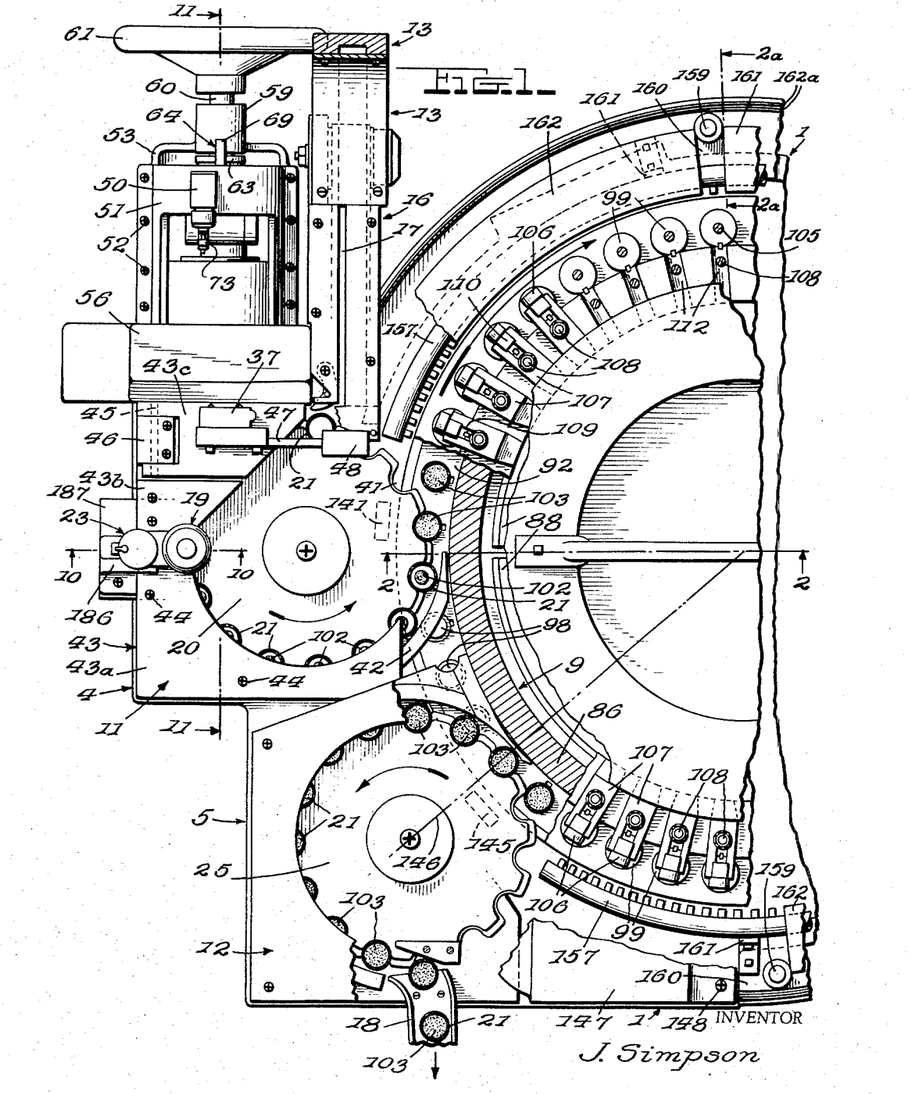
Figure 1 is a top plan view partly broken away and in section.
Figure 8:
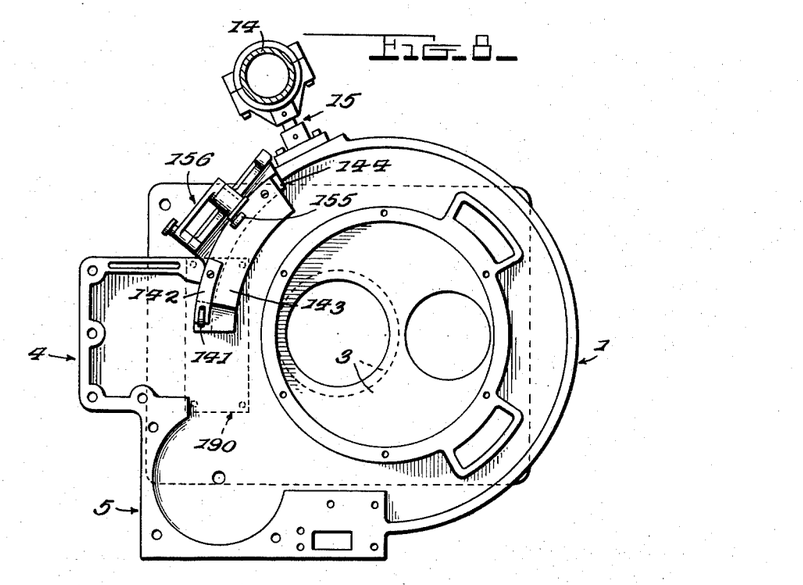
Figures 8 and 9 are respectively a top plan and a side elevation partly in section, showing the base structure of the machine, the roller which turns the aforesaid stub in clamp closing direction, the motor mounting means, and a hand set means which may be employed to open any clamp immediately of the closing thereof, for liner inspection.

A base plate 1 (Figures 1, 2, 6, 8, 9 and 11) is secured at 2 (Figures 2 and 9) upon a pedestal 3, said base plate 1 being generally circular as seen in Figures 1 and 8 but having two contiguous laterally projecting portions 4 and 5. A vertical spindle 6 (Figure 2) is provided with an attaching base 7 which is secured at 8 to the base plate 1, and a cap conveying and liner curing turret 9 (Figures 1 to 5) is rotatably mounted upon said spindle 6 by means of roller bearings 10. A feed turret assembly 11 (Figures 1, 10, 11, 19 and 20) is mounted upon the base plate projection 4 and a discharge turret assembly 12 (Figure 1) is mounted on the projection 5.

The caps to be lined may be supplied to the feed turret assembly 11 in any preferred manner, and a well known Nagy feeder (U.S. Patent 1,932,529) is preferably employed. A portion of the discharge chute of this feeder is shown at 13 in Figure 1, and Figure 8 discloses a post 14 secured at 15 to the base plate 1 for supporting said feeder. A cap guideway 16 and cap conveying belt 17 (Figures 1 to 12) are shown extending from the chute 13 to the feed turret assembly 11, and in Figure 1 a discharge chute 18 is shown extending from the discharge turret assembly 12.

Figure 9:
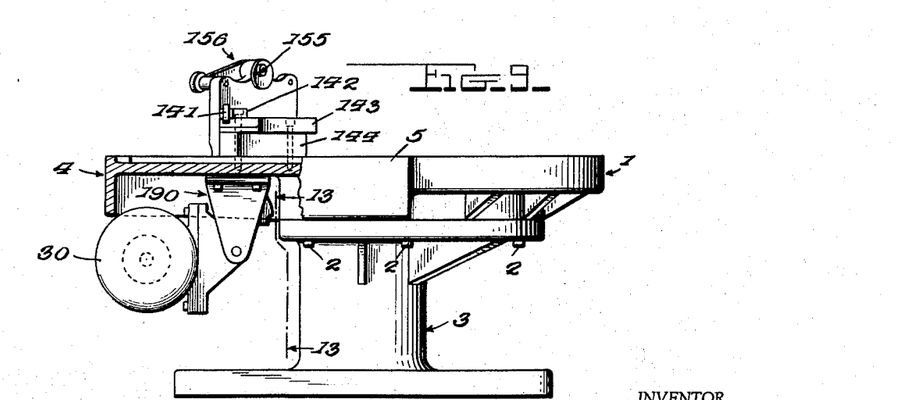
Figure 10:
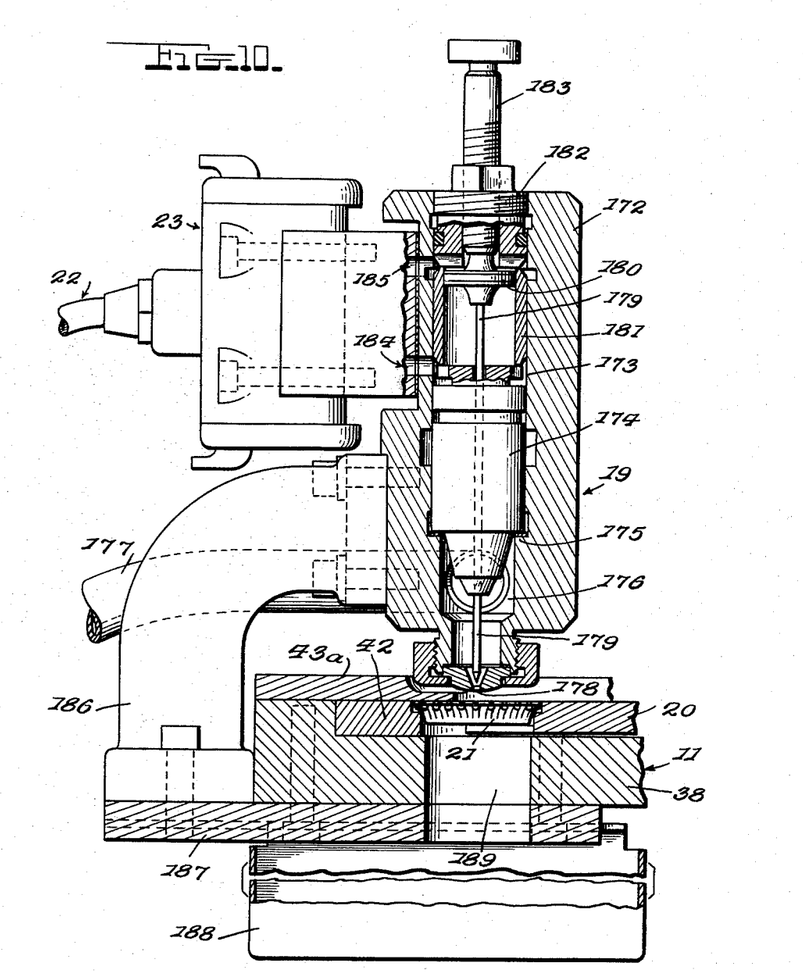
Figure 10 is an enlarged vertical section, partly in elevation, substantially on line 10—10 of Figure 1, showing the gun which injects the liner forming plastic into the caps.

A gun 19 (Figures 1 to 10) is mounted over the feed turret 20 of the assembly 11 for injecting a quantity of thermo curable and somewhat fluid plastic into the unlined caps 21 as these caps are carried to the curing turret 9 by said feed turret 20. The gun 19 is pneumatically actuated and the actuating compressed air is supplied through a conduit 22 (Figure 10). A bellows electrically controlled air powered valve 23 controls the admission of compressed air to the gun 19 and the exhaust of air therefrom and a timer 24 (Figure 12) controls said valve 23. This valve may be of the general construction shown in United States Letters Patent No. 2,755,762 of July 24, 1956, entitled, Magnetically Operated No-Can No-Cover Feed.

*Driving means*

Figures 11, 11A:
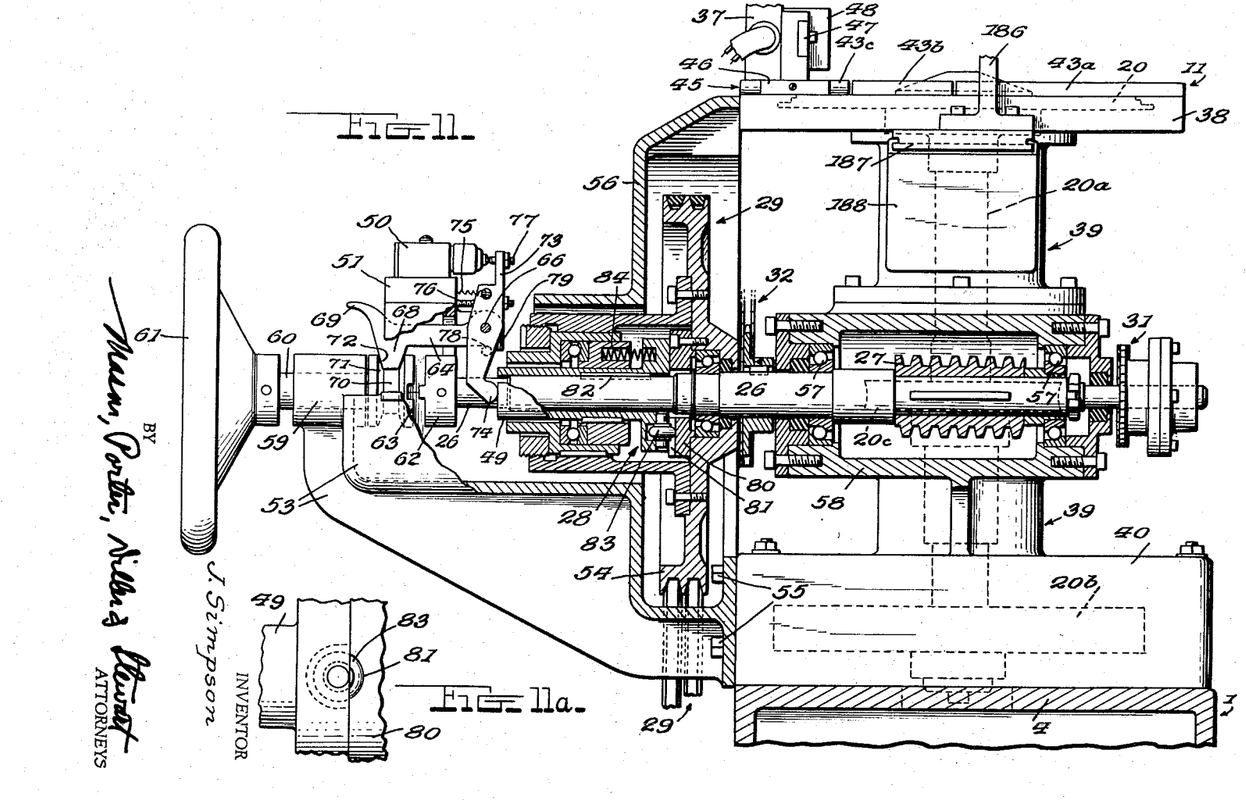
Figure 11 is an enlarged vertical section partly in elevation, substantially on line 11—11 of Figure 1, showing primarily the drive shaft, the overload clutch for driving said drive shaft, the inching means and the switch and lock associated with said clutch and said inching means. This view also illustrates the manner in which the feed turret assembly is mounted on the base structure of the machine and the manner in which the feed turret is driven.
Figure 11a is a fragmentary edge view showing the driving and kick out roller of the clutch and associated elements of Figure 11.
Figures 12, 12A:
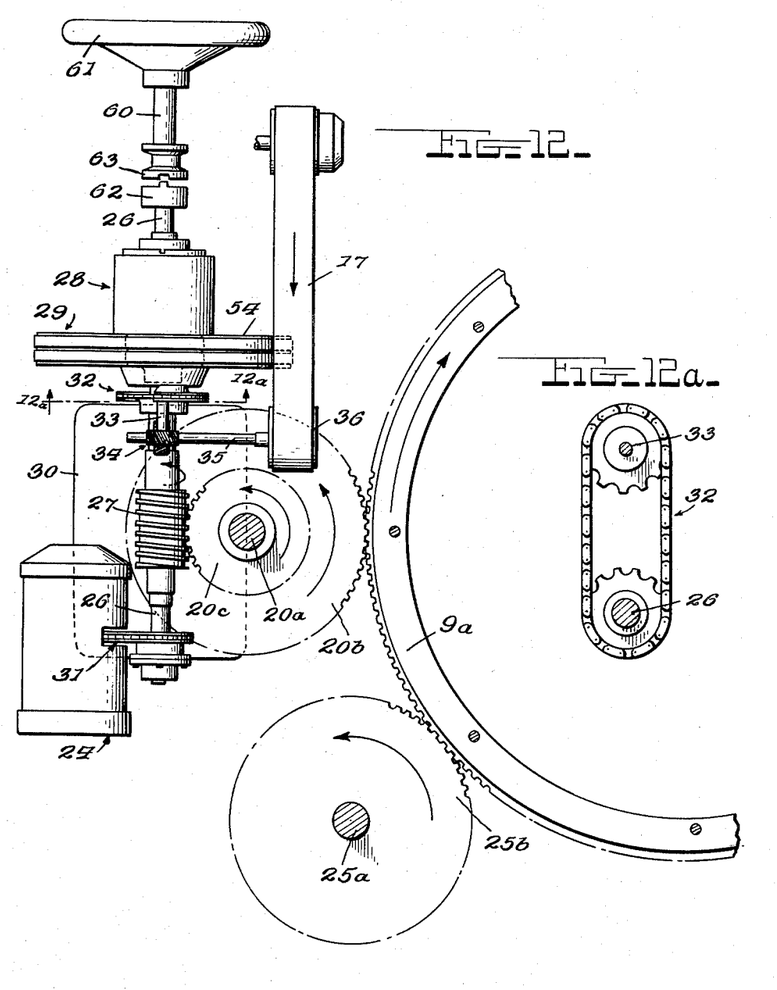
Figure 12 is a plan view showing the various driven elements of the machine and the manner in which they are driven one from another.
Figure 12a is a detail section on line 12a—12a of Figure 12 clarifying a portion of the latter.

The timer 24, the feed turret 20, the curing turret 9 and the discharge turret 25 (Figure 1) are operated in timed relation by the means shown in Figures 11 and 12, to which reference is now made. In these views, a vertical shaft 20a carries the feed turret 20 and is provided with a spur gear 20b and a worm gear 20c. The spur gear 20b meshes with a ring gear 9a on the lower end of the turret 9, and this ring gear 9a meshes with a spur gear 25b on the shaft 25a of the discharge turret 25 (Figure 1). A horizontal drive shaft 26 is provided, said drive shaft 26 having a worm 27 in mesh with the worm gear 20c. The drive shaft 26 is driven by a clutch 28 and a belt and pulley drive 29 from an electric motor 30, and said drive shaft 26 is chain and sprocket connected at 31 to the timer 24. The drive shaft 26 is also connected by a chain and sprocket drive 32 with an overlying shaft 33, this shaft 33 being gear connected at 34 with a shaft 35 carrying the driving pulley 36 of the cap conveying belt 17.

The motor 30, belt and pulley connection 29 and clutch 28 drive the drive shaft 26; this drive shaft, through the worm and worm gear connection 27, 20c, drives the feed turret shaft 20a and consequently the feed turret 20; shaft 20a and its spur gear 20b drive the ring gear 9a and consequently the curing turret 9; the ring gear 9a drives gear 25b and shaft 25a and therefore drives the discharge turret 25 (Figure 1); and the drive shaft 26 also drives the timer 24 by means of the sprocket and chain connection 31. All of the elements 9, 20, 25, 17 and 24 are thus driven in timed relation with each other to insure proper operation of the machine. However, adequate precautionary means are provided to automatically stop the machine in case a cap should become jammed, or overload should occur from any other cause. Moreover, precautionary locking means is provided which prohibits operation of an inching means (employed for slowly rotating the drive shaft 26 by hand for machine setting, adjustment, etc.) until a switch for the motor 30 is opened. As these means are related to machine driving, just discussed, it will be well to describe them before entering upon other features of the machine.

*Motor stopping jam switch*

A motor stopping switch 37 (Figures 1, 11, 19 and 20) is associated with the feed turret assembly 11 to stop the machine if a cap 21 should jam during entrance to the feed turret 20. The construction for operating this jam switch 37 can best be explained after first describing the general construction of the feed turret assembly 11. This assembly 11 includes a horizontal base plate 38 (Figures 11, 19 and 20) secured upon a housing 39 (Figure 11), this housing 39 being provided with an enlarged lower end 40 which contains the spur gear 20b and is suitably mounted on the lateral projection 4 of the machine base plate 1. The feed turret 20 is flat and directly overlies the base plate 38, and said turret 20 is formed with peripheral cap receiving pockets 41. An arcuate track 42 is secured to the base plate 38 at the periphery of the turret 20 to hold the caps 21 against radial displacement from the pockets 41, and hold down means 43 is provided to hold said caps against upward displacement. In the present disclosure, this hold down means comprises three horizontal plates 43a, 43b and 43c, the plates 43a and 43b being suitably secured at 44 to the base plate 38 while the plate 43c is pivoted at 45 to a block 46 on said base plate 38, for upward yielding. This plate 43c is disposed over the initial end 42a of the arcuate track 42 and extends into close proximity with the inner end of the cap guideway 13.

Figure 19:
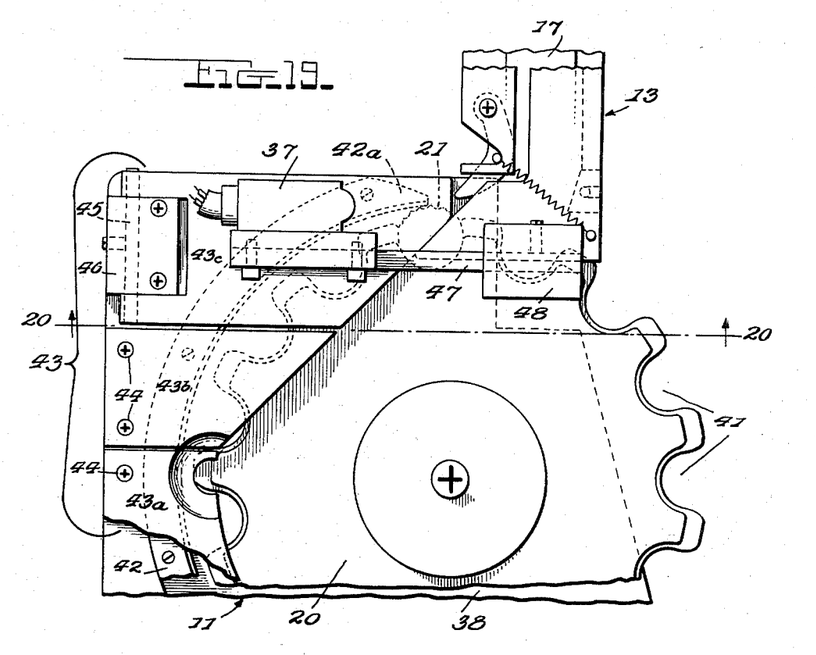
Figure 19 is a plan view of a portion of the feeding means, enlarged over Figure 1 and showing the switch and associated elements effective to stop the machine if a cap becomes jammed in the feed turret.
Figure 20:
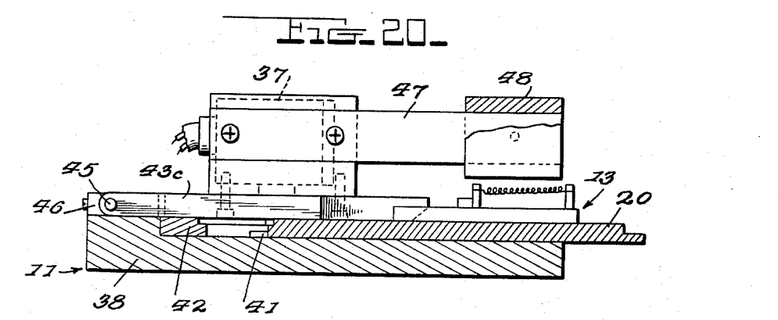
Figure 20 is a vertical section on line 20—20 of Figure 19.

The plate 43c carries the motor stopping switch 37, and this switch remains closed unless a jammed cap exerts upward pressure on said plate 43c and tilts this plate upwardly. Upon such tilting, however, the switch 37 opens and stops the motor 30. This switch may be of any appropriate construction to perform the allotted function and it may be embodied in the motor circuit in any desired way.

The plate 43c is provided with a hold down arm 47 having an adjustable weight 48, the plate being thus yieldably biased to its normal cap hold down position. However, other suitable provisions could well be made to effect this yieldable biasing and in fact the plate 43c might itself be formed of spring metal, in which instance its outer end would of course be fixed instead of pivoted to the base plate 38.

*Clutch operated overload switch*

The above mentioned clutch 28 for driving the drive shaft 26, is of a type which will automatically "kick-out" or disengage upon overload and said clutch includes a sleeve 49 (Figures 11, 15 and 17) surrounding said drive shaft 26 and shiftable toward the outer end of the latter when clutch disengagement occurs. This shifting is utilized to open a second motor stopping switch 50 (Figures 1, 11 and 15 to 17). This switch 50 is mounted upon an arched bracket 51 which is secured at 52 (Figures 1 and 16) to a longitudinally channeled bracket arm 53, said arm 53 underlying the outer end portion of the drive shaft 26 and the uppermost pulley 54 of the belt and pulley drive 29. The inner end of the arm 53 is rigidly secured at 55 (Figure 11) to the base 40 of the feed turret supporting housing 39, and said inner end of said arm 53 is provided with a housing 56 for the pulley 54 and the clutch 28 of the drive shaft 26. This drive shaft 26 is mounted in bearings 57 in the ends of a worm housing 58 forming a rigid part of the aforesaid housing 39, the driving worm 27 for the feed turret 20 being within said worm housing 58.

*Inching means*

Figure 17:
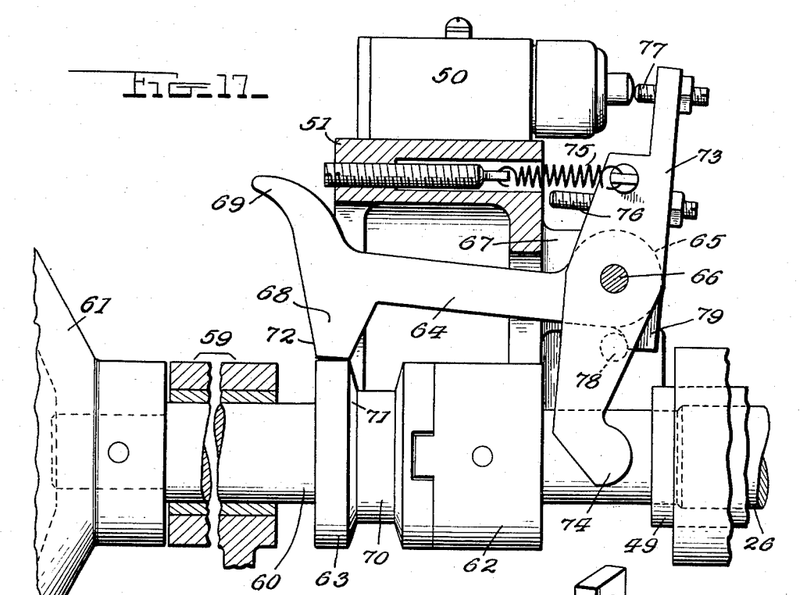
Figure 17 is a view similar to Figure 15 but showing the lock released and the switch actuator again in switch open position.
Figure 18:
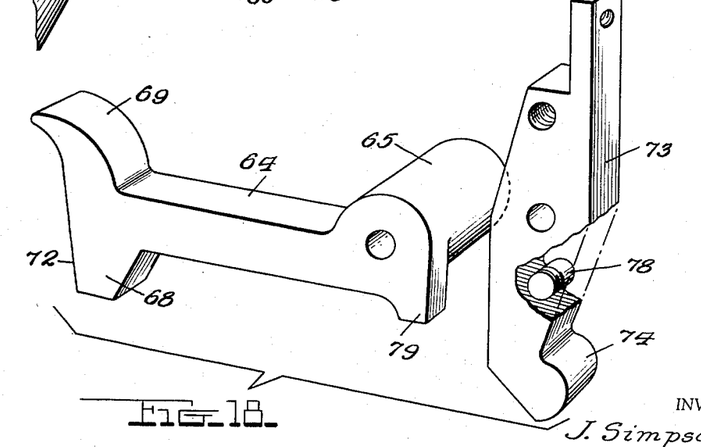
Figure 18 is a perspective view of the inching shaft lock and the coacting switch actuator.

The outer end of the bracket arm 53 is provided with a bearing 59 spaced from and axially aligned with the outer end of the drive shaft 26. An inching shaft 60 having a hand wheel 61 (Figures 1, 11, 12, 15 and 17) is rotatable and slidable in the bearing 59. The adjacent ends of the two shafts 26 and 60 have cooperable clutch elements 62 and 63 for connecting the inching shaft 60 with the drive shaft 26, as seen in Figure 17, when said drive shaft is to be turned slowly by hand in setting the machine, making adjustments, etc. In order to engage the clutch element 63 of the inching shaft with the element 62 of the drive shaft 26, it is necessary to slide the former shaft toward the latter (compare Figures 15 and 17). A lock is provided, however, for prohibiting this sliding while the switch 50 is in closed position, thereby overcoming any possibility of the machine being accidentally driven by power while using the inching means.

*Inching means lock*

Figure 15:
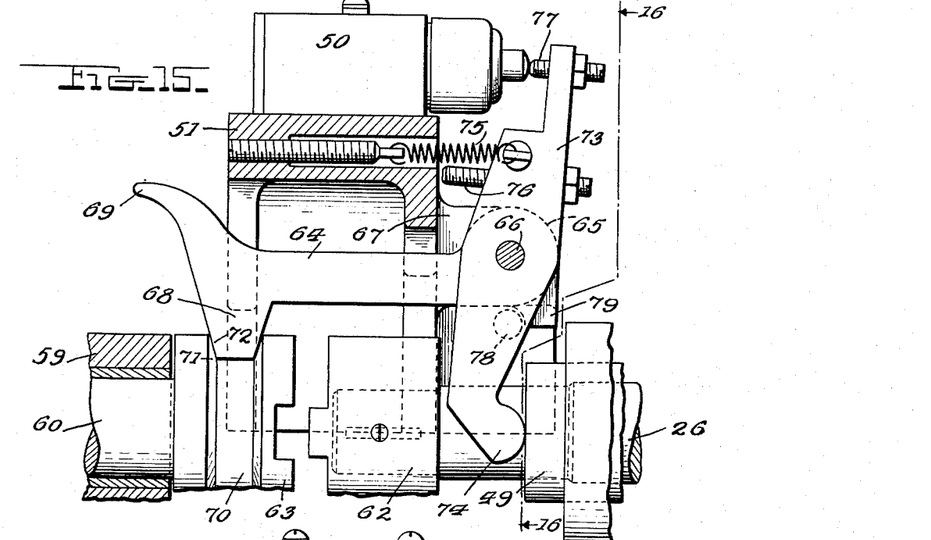
Figure 15 is an enlarged fragmentary side elevation, partly in section, showing the switch and lock associated with the inching shaft and an element of the overload clutch, the switch actuator being in switch open position and the lock in operative position.
Figure 16:
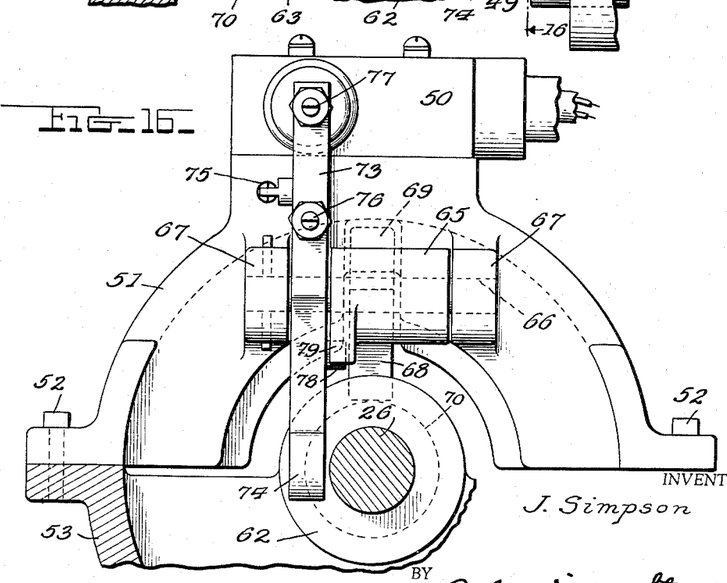
Figure 16 is an end elevation of Figure 15 with the drive shaft in section, as indicated by line 16—16 of Figure 15.

The inching means lock is shown in the form of an arm 64 seen best in Figures 15 to 18 although appearing also in Figures 1 and 11. This arm 64 underlies the arched bracket 51 and extends longitudinally over the clutch elements 62 and 63. One end of this arm 64 has a hub 65 which is pivotally mounted on a pin 66 carried by lugs 67 of the bracket 51. The other end of the arm 64 has a locking nose 68 and a releasing handle 69. The clutch element 63 of the inching shaft 60 has a peripheral groove 70 which receives the nose 68 to lock the inching shaft 60 in idle position, said groove and nose having shoulder portions 71 and 72 which then abut each other as seen in Figures 11 and 15. The locking arm 64 must be swung upwardly in order to release the inching shaft 60 for engagement with the drive shaft 26. This upward swinging opens the switch 50 due to construction now to be described.

A vertical actuating lever 73 is provided for the switch 50 said lever being fulcrumed between its ends on the pin 66 at one side of the locking arm 64. The lower end 74 of the lever 73 is biased toward the outer end of the sleeve 49 of the clutch 28 by means of a spring 75 which connects said bar 73 with the bracket 51, and a stop screw 76 limits the movement of said lever 73 under the influence of said spring 75. The upper end of the lever 73 carries a switch operating screw 77 which normally holds the switch 50 in closed position. If the clutch 28 disengages under the influence of overload, the sleeve 49 rocks the lever 73 from the position of Figure 11 to that of Figure 15, allowing the switch 50 to open and stop the motor.

The lever 73 and locking arm 64 are provided with cooperable abutments 78 and 79 which transmit movement from said arm 64 to said lever 73 (Figure 17) to cause opening of the switch 50 when said arm 64 is swung to released position to allow engagement of the inching shaft 60 with the drive shaft 26. As long as the inching shaft is connected with the drive shaft 26, the locking arm 64 rests on the clutch element 63 as shown in Figure 17. The abutments 78 and 79 then hold the lever 73 in its switch open position. The motor 30 cannot therefore be inadvertently operated while the inching means is engaged with the drive shaft 26. The lever carried abutment 78 merely moves away from the arm carried abutment 79 (Figure 15) when the lever 73 is operated by the sleeve 49 of the clutch 28, and the locking arm 64 therefore remains in locking position.

It will be seen from the foregoing explanation that the inching shaft 60 cannot be connected with the drive shaft 26 while the motor switch 50 is in closed position and that an important safety factor is thus provided.

*Overload clutch*

Some clarifying statements with regard to the clutch 28 may be made before proceeding further. This clutch embodies a drive plate 80 (Figures 11 and 11a) secured to the pulley 54 and having a radial groove 81 facing the sleeve 49. This sleeve 49 is splined or slidably keyed at 82 to the drive shaft 26 and carries a driving and kick out roller 83 which is normally held in the groove 81 of the drive plate 80 by spring means 84 which presses said sleeve 49 toward said drive plate 80. In case of overload, the roller 83 is forced from the groove 81, thereby sliding the sleeve 49 to cause opening of the motor stopping switch 50 as above explained. As the other elements of the clutch 28 have obvious functions, further explanation seems unnecessary.

Curing turret and elements thereon

Figures 2, 2A:
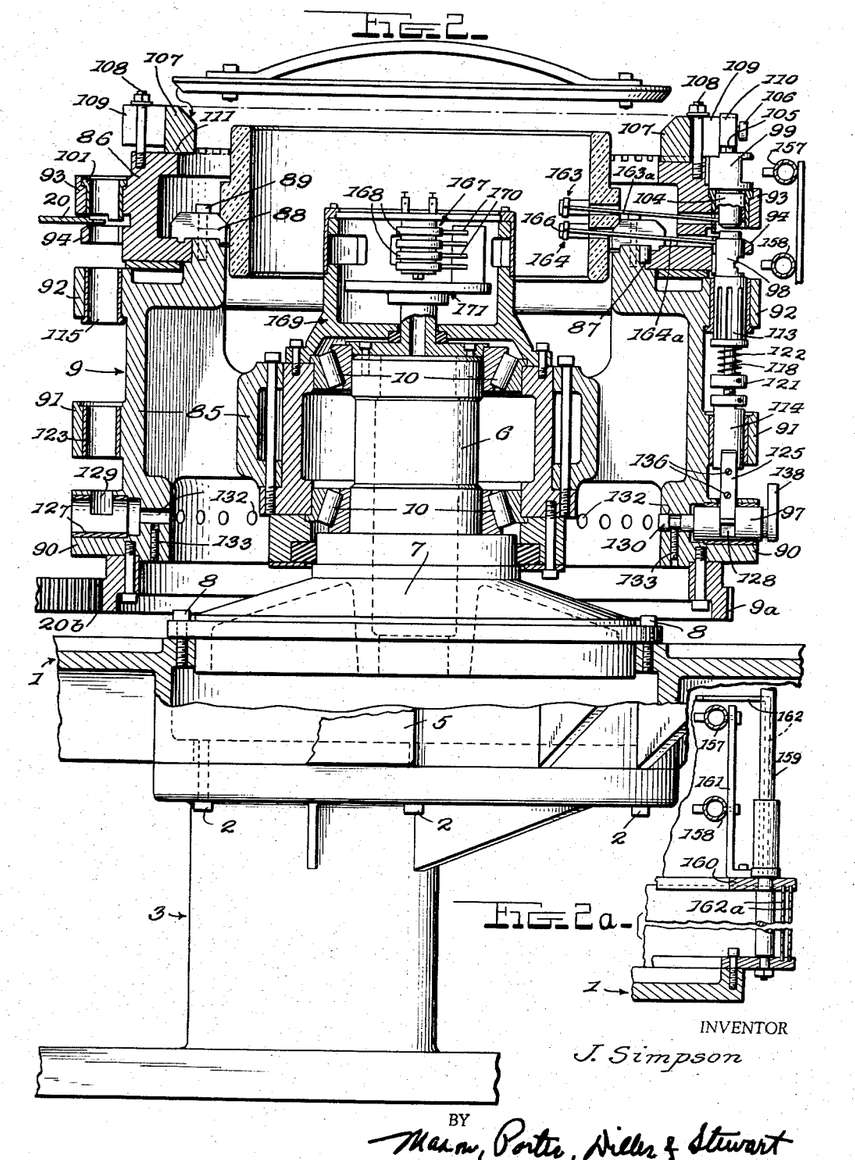
Figure 2 is a vertical sectional view partly in elevation, on line 2—2 of Figure 1, the clamp and clamp operating means being removed at the left side of the view.
Figure 2a is a detail vertical section showing the burner mounting means a fragment only of which is shown in Figure 2. This view also discloses portions of a turret surrounding housing and may be considered as taken on line 2a—2a of Figure 1.
Figure 3:
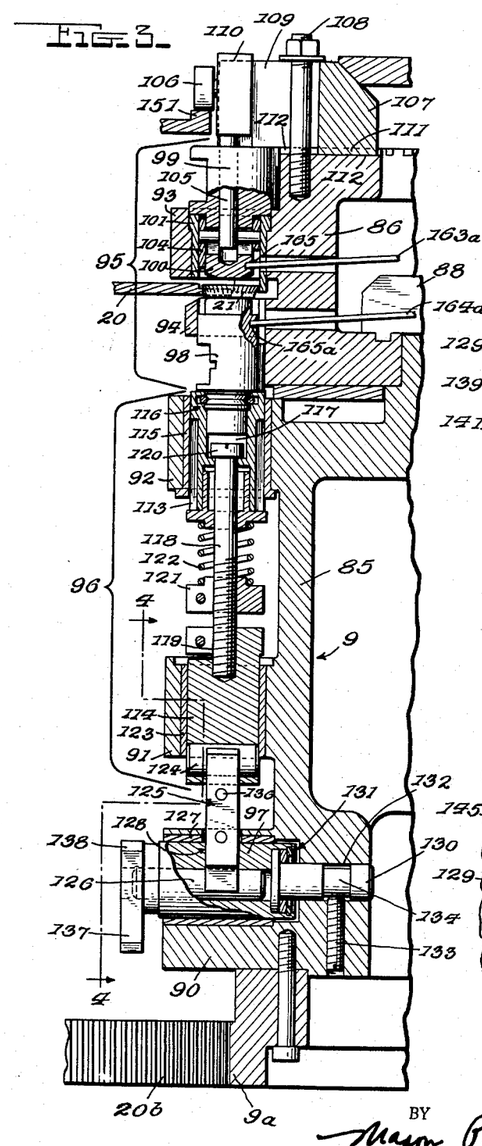
Figure 3 is an enlarged vertical section through the side of the turret at the left of Figure 2, showing the clamp and clamp operating elements in place and a cap in the open clamp.

The construction of and that associated with the liner curing turret 9 will now be described and during such description attention is directed to Figures 1 to 5. This turret, as seen in Figures 2 and 3, is composed of a main cylindrical section 85 and an upper section or ring 86 secured upon said main section 85 by means of a dowel pin 87 (Figure 2), arcuate clamping ring sections 88 and screws 89. The main turret section 85 is provided with a peripheral circumferentially extending projection 90, with a second and similar projection 91 somewhat above said projection 90, and with a third and similar projection 92 above said second projection 91. The upper turret section 86 is provided with an upper peripheral, circumferentially extending projection 93 and with a similar projection 94 spaced downwardly from said upper projection 93 sufficiently to permit reception of the peripheral portion of the feed turret 20 between said projections 93 and 94 (see Figures 2 and 3).

Circumferentially spaced liner shaping and curing clamps are mounted in the projection 93, 94 and said clamps are generally denoted by the reference number 95 and the accompanying bracket in Figure 3. Vertical clamp operating plungers are mounted in the projections 91, 92 and are generally denoted by the reference number 96 and the accompanying bracket in Figure 3. Plunger operating stubs 97 are mounted in the projection 90.

Clamp construction

Each clamp 94 comprises a lower movable clamp member 98 and an upper fixed clamp member 99. The lower clamp member 98 is cylindrical and vertically slidable in an opening in the projection 94. The upper clamp member 99 is likewise cylindrical, is disposed upon the projection 93 and is provided with a reduced lower end portion 100 received within a vertical bushing 101 in the projection 93. The end 100 constitutes a die for shaping the plastic 102 (Figure 1) contained by any cap 21 positioned under said end 100 by the feed turret 20, into liner form 103 (Figure 1), upon raising of said cap by the lower clamp member 98. After this operation, the upper and lower clamp members 99, 98 cooperate in holding the cap and its liner while being conveyed by the turret 9, and during this conveying, liner curing heat is applied by means yet to be described.

Stripper

A stripper sleeve 104 surrounds the reduced end 100 of the upper clamp member 99 within the bushing 101 and is provided with an operating stem 105 which extends upwardly through and beyond said member 99. The upper end of this stem 105 is provided with a lateral roller 106 operated in a manner later described to raise the stripper sleeve 104 for clamp reception of a cap 21 (see Figure 3) and to lower said stripper sleeve for cap ejection to the discharge turret 25.

A hold down block 107 (Figures 1, 2 and 3) is provided for each upper clamp member 99, said hold down block being secured upon the upper turret section 86 by a clamping bolt 108. The block 107 is formed with a slot 109 which straddles the bolt 108 and the upper portion 110 of the stripper stem 105. This stripper stem portion 110 and the side walls of the slot 109 have slidably engaged flat surfaces which hold the stem 105 against turning. The block 107 is held against any pivotal movement by a rib 111 on its lower side (Figures 2 and 3) received in a groove 112 in the turret section 86. Upon loosening of the bolt 108, the block 107 may be slid inwardly (see upper left of Figure 2) to allow removal of the upper clamp member 99, the stripper sleeve 104, the stem 105 and the roller 106 as a unit.

Plunger construction

Each plunger 96 embodies an upper cylindrical section 113 and a lower cylindrical section 114. The upper section 113 is slidably mounted in a bushing 115 secured in the turret projection 92, and this upper section 113 is stud and ring connected at 116 (Figure 3) with the lower end of the lower clamp member 98. An upwardly open socket 117 is formed in the upper plunger section 113, and a vertical screw 118 extends from this upper section to the lower section 114. The lower end of this screw 118 is adjustably threaded at 119 into the lower section 114 and the upper end of said screw has a head 120 in the socket 117. A collar 121 is adjustably secured to the screw 118 and a compression spring 122 is interposed between said collar and the upper plunger section 113. When the plunger 96 is in lowered position (Figure 3) the head 120 of the screw 118 abuts the bottom of the socket 117 and the desired spacing is thus maintained between the upper and lower plunger sections 113 and 114. When the plunger 96 is being raised, however, and its upper section 113 lifts the plastic containing cap 21 until the plastic abuts the die 100, the spring 122 is compressed by the final upward movement of the lower plunger section 114. This spring then acts to further raise the lower clamp section 98 and the plastic containing cap 21 to the limit allowed by the screw head 120. During this movement, the die 100 shapes the plastic within the cap 21 into the form of a cap liner of precision thickness, and as the turret 9 rotates, this liner is heat cured.

Plunger operating means

The lower plunger section 114 is slidably mounted in a bushing 123 of the projection 91 and is provided with a wrist pin 124. A connecting rod 125 extends from this wrist pin 124 to a crank pin 126 within the stub 97 above mentioned. This stub 97 is rotatably mounted in a bushing 127 which is disposed radially of the turret 9 in the projection 90. The stub 97 and bushing 127 are recessed at 128 to receive the lower end of the connecting rod 125 and the upper side of the projection 90 has a groove 129 (Figure 4) in which the lower ends of all of the connecting rods are operable. A peripherally grooved pin 130 is suitably connected at 131 with the inner end of the stub 97, said pin 130 being coaxial with said stub 97 and being received in an opening 132 in the lower turret section 85. A screw 133 threaded upwardly in this turret section 85, engages the groove 134 of the pin 130. Loosening of this screw 133 permits withdrawal of the stub 97 from the turret after removal of the connecting rod 125 (see left portion of Figure 2). The connecting rod 125 is in two separable halves 135 held together by screws 136 to permit easy removal when desired.

Figure 4:
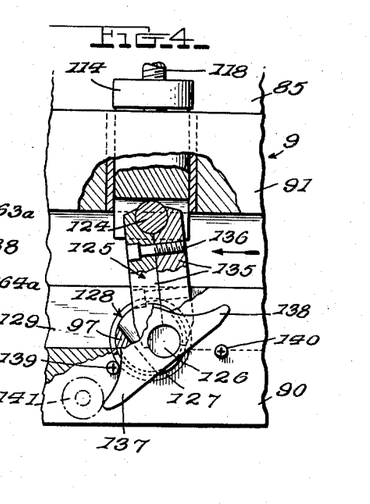
Figure 4 is a detail vertical section partly in elevation taken substantially on line 4—4 of Figure 3 showing the operating means for the plunger which carries the movable member of the clamp, the parts being shown in clamp open position as in Figure 3.
Figure 5:
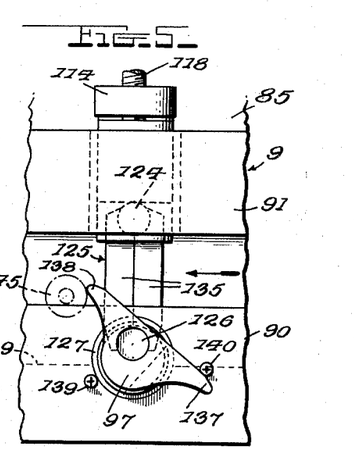
Figure 5 is a view similar to Figure 4 but showing the parts in clamp closed position.

The outer end of the stub 97 is provided with two arms 137 and 138 projecting laterally therefrom in opposite directions. These arms are cooperable with relatively stationary means yet to be described, in turning the stub 97 to plunger lowering clamp opening position (Figure 4) and to plunger raising clamp closing position (Figure 5). In the latter position, the stub 97, crank pin 126 and wrist pin 124 are on vertical dead center. One stop 139 is shown in Figures 4 and 5 for limiting the clamp opening movement of the stub 97, and another stop 140 is shown for limiting the clamp closing movement of said stub 97.

A stationarily mounted abutment roller 141 (Figures 1, 4, 8 and 9) is provided to coact with the lower arm 137 to effect closing of the clamp 95 as soon as the feed turret 20 places a plastic containing cap 21 between the clamp members 98 and 99. This roller 141 is located only a few degrees beyond a line intersecting the axes of the feed turret 20 and the liner curing turret 9, as seen in Figure 1. The section line 2—2 of this view, if extended further to the left, would constitute the line referred to. It is upon this line that the cap 21 is fully aligned with the clamp members 98 and 99 and ready for clamp closing. The manner in which the lower arm 137 coacts with the roller 141 is shown in Figure 4 and the manner of mounting said roller 141 is illustrated in Figures 8 and 9. In these views, it will be seen that the roller 141 is mounted on an arm 142 secured upon an arcuate plate 143. This plate 143 is mounted upon the machine base plate 1 and is upwardly spaced from the latter by means of an arcuate spacer block 144. When the lower arm 137 strikes the roller 141 (Figure 4) said arm effects turning of the stub 97 from the clamp open position of Figure 4 to the clamp closed position of Figure 5.

Figure 6:
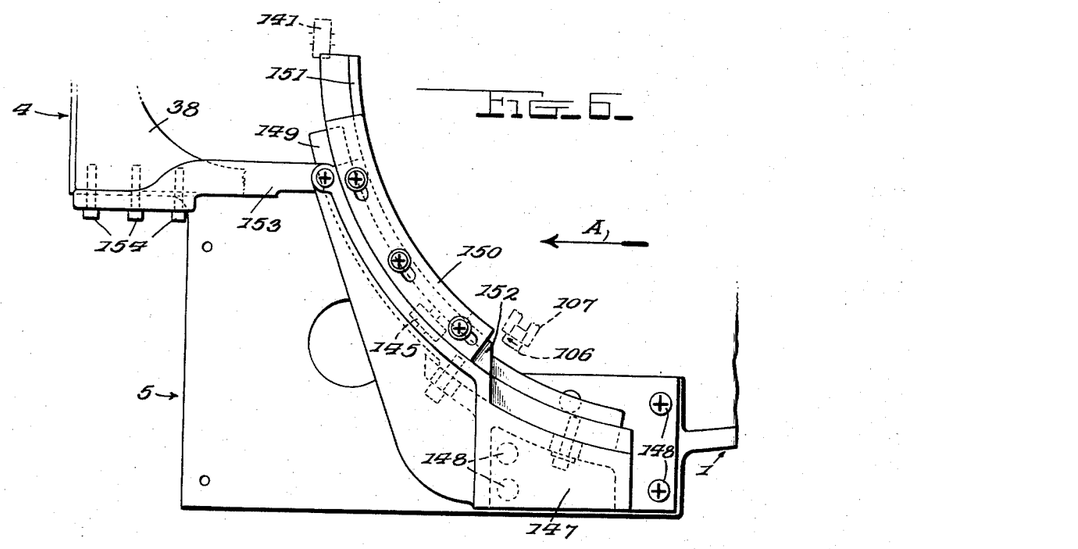
Figures 6 and 7 are respectively a top plan view and an inner side elevation of a bracket post carrying a roller for effecting turning of the clamp operating stub in clamp opening direction, and also carrying the raising and lowering means for the stripper.
Figure 7:
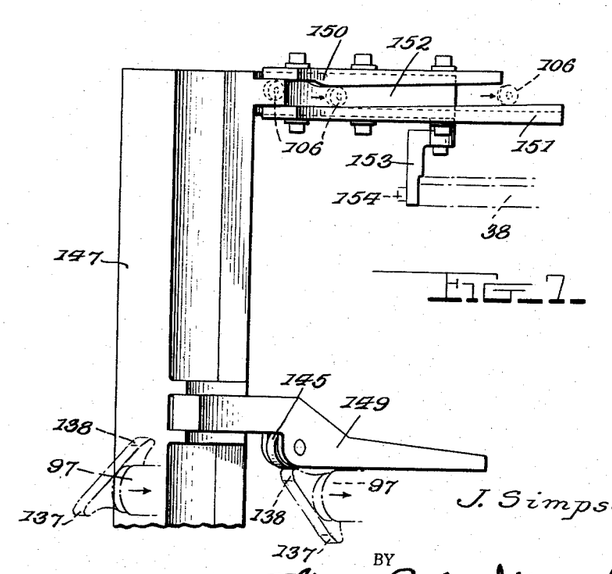

A second abutment roller 145 (Figures 1, 5, 6 and 7) is provided to coact with the upper arm 138 to effect opening of the clamp 95 to free the lined cap for reception in the discharge turret 25. This roller 145 is located only a few degrees behind a line 146 which intersects the axes of the curing turret 9 and discharge turret 25, as seen in Figure 1. It is upon this line that the lined cap is fully received in a pocket of the discharge turret and ready for travel to the discharge chute 18. The manner in which the upper arm 138 coacts with the roller 145 is shown in Figures 5 and 7, and the mounting means for said roller 145 is shown in Figures 6 and 7. In these views, a bracket post 147 is shown, said post being secured at 148 upon a portion of the projection 5 of the base plate 1. The lower portion of Figure 1 also shows a fragment of this post 147. Secured to the lower portion of this post 147, is a horizontal arcuate arm 149 in the lower side of which the roller 145 is mounted. When the upper arm 138 strikes the roller 145 (Figures 5 and 7) the stub 97 is rocked from the clamp closed position of Figure 5 to the clamp open position of Figure 4.

*Stripper operating means*

Directly above the clamp opening roller 145, the post 147 carries an arcuate stripper operating cam 150 (Figures 6 and 7) to coact with the roller 106 of the stripper sleeve 104 (Figures 2 and 3) to lower said stripper sleeve and free the cap 21 and its cured lining 103 from the die 100 (Figure 3) as the clamp 95 (Figure 3) opens. Immediately below the cam 150, the post 147 carries another arcuate cam 151 which coacts with the roller 106 to again raise the stripper sleeve roller 104 by the time the clamp 95 which has just discharged a cap and its cured liner, reaches the position at which it is to receive another plastic containing cap. The two cams 150 and 151 are mounted respectively against the upper and lower sides of an arcuate arm 152 which is rigidly carried by the upper end of the post 147. A brace bracket 153 extends from the arm 152 and is anchored at 154 to the base plate 38 of the feed turret assembly 11.

*Additional clamp opening means*

If desired, another roller 155 (Figures 8 and 9) may be mounted on the base 1 just beyond the clamp closing roller 141. This roller 155 permits opening of any clamp 95 immediately after closing of the latter, when slowly operating the machine by hand, for the purpose of examination of the cap liner initially formed by said clamp closing. Any suitable means 156 may be provided for permitting hand setting of the roller 155 in either a normal ineffective position or in an operative position.

*Heating means*

It was above explained that heat is applied for curing the plastic liners 103 in the caps 21 during travel of the lined caps with the curing turret 9. The heat is supplied by arcuate gas burners 157 and 158 (Figures 1, 2 and 2a), said burners being mounted to direct jets of flame against the clamp members 99 and 98, respectively, to heat these members to the desired liner curing degree. The burners 157 and 158 are mounted in the manner best seen in Figures 1 and 2a and described below.

*Burner mounting means and housing structure*

Circumferentially spaced posts 159 are rigidly mounted on the base plate 1 and support a horizontal ring 160, and burner supporting brackets 161 are mounted on said ring 160. The posts 159 also serve to mount arcuate housing sections 162 which extend around the burners 157 and 158 and overlie the former, said housing sections 162 being above the ring 160 and being outwardly swingable for inspection purposes. Below the ring 160, arcuate slidable doors 162a have been shown, said doors jointly surrounding the various plungers 96 and the operating means of the latter. These doors 162a may be opened for inspection and adjustment access to the movable parts normally housed thereby.

*Burner control means*

The gas control valves (not shown) for the burners 157 and 158, are of a conventional electrically operable type, and two turret carried thermostats 163 and 164 (Figure 2) are provided to control said valves to maintain the desired temperature of the clamp members 99 and 98 respectively. The thermostats 163 and 164 have feeler portions 163a and 164a, said feeler portions extending to the clamp members 99 and 98 respectively. These clamp members have sockets 165 and 165a (Figure 3) which receive the outer ends of the feeler portions 163a and 164a, respectively. As the lower clamp member 98 must have vertical movements, provision is made for allowing the lower feeler portion 164a to yield vertically. To attain this end, the lower thermostat 164 is pivotally mounted at 166 (Figure 2). The upper thermostat 163 may be mounted in the same manner for uniformity.

A brush and collector ring assembly 167 is shown in Figure 2 for conducting current to and from the turret carried thermostats 163 and 164. The collector rings 168 rotate with a housing 169 secured to the main section 85 of the turret 9. The brushes 170 are mounted on a support 171 stationarily mounted on the turret mounting spindle 6.

*Plastic discharge gun*

While the invention is not concerned with the specific construction of the gun 19 (Figures 1 and 10) which discharges the liner forming plastic 102 into the caps 21, it will be well to briefly describe said construction, for which purpose, reference is made to Figure 10. A vertically elongated body 172 is provided having a longitudinal bore 173. Between the ends of this bore, a packing assembly 174 is disposed upon a shoulder 175. The portion of the bore 173 below the assembly 174 constitutes a chamber 176 to which a fluid, viscous plastic (preferably a thermosetting resin) is supplied at constant pressure through a conduit 177. A restricted discharge port 178 is provided from the lower end of the chamber 176, and a needle valve 179 controls this port 178. This needle valve extends through and above the packing assembly 174 and is provided at its upper end with a piston 180. A cylinder 181 receives this piston and is held in the upper portion of the bore 173, against the packing assembly 174, by means of a screw plug 182. A stop screw 183 is carried by this plug 182 for limiting the upward movement of the piston 180 and thereby limiting the opening movement of the needle valve 179. Fluid pressure to raise and lower the piston 180 is directed through suitable port means 184 and 185 by the bellows valve 23 to effect opening and closing of the needle valve 179.

The body 172 is carried by a bracket 186 which is mounted on a plate 187 secured to and projecting beyond the base plate 38 of the feed turret assembly 11. The plate 187 removably supports a receptacle 188 (Figures 10 and 11) to receive the plastic discharged from the gun 19 if no cap should be present receive said plastic. To admit this plastic to the receptacle 188 a passage 189 is formed in the plates 38 and 187.

Motor mounting means

Figure 13:
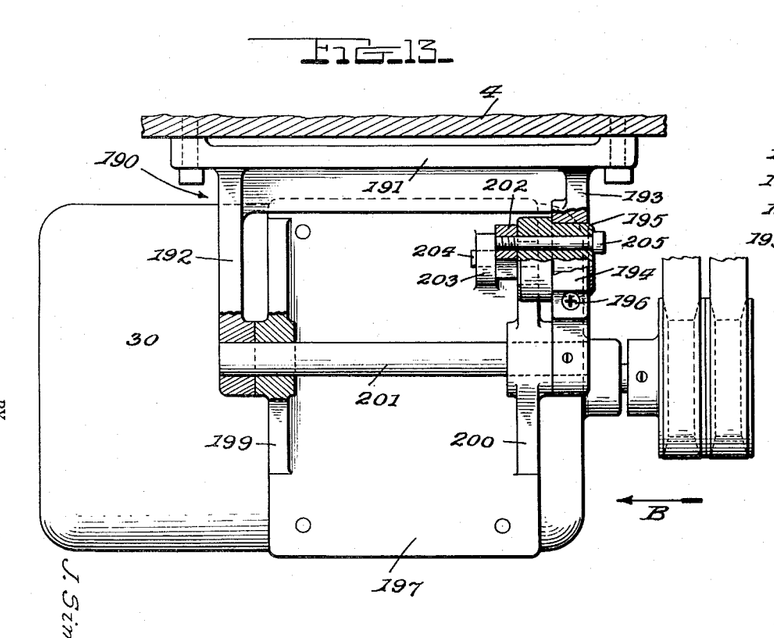
Figure 13 is a view partly in elevation and partly in section, showing the motor mounting means, this view being taken substantially on line 13—13 of Figure 9.
Figure 14:
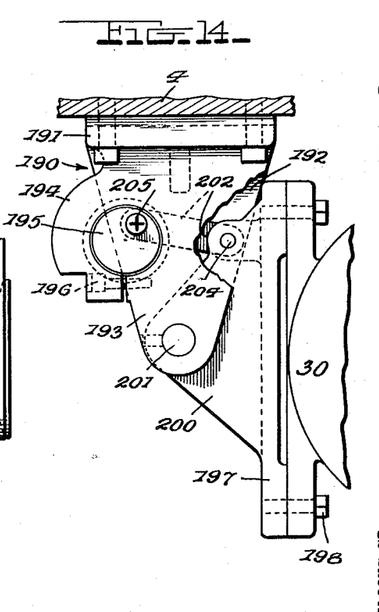
Figure 14 is an end elevation of the motor mounting means as indicated by the arrow B of Figure 13.

A preferred mounting means for the machine driving motor 30, is shown in detail in Figures 13 and 14, and the location of this mounting means is shown in Figures 8 and 9. A supporting bracket 190 is provided for attachment to the projection 4 of the base 1, said bracket 190 comprising a horizontal attaching plate 191 and two spaced arms 192 and 193 projecting downwardly from and integral with said attaching plate 191. The arm 193 has an integral split bearing 194 in which a cylindrical stub 195 is mounted for rotative adjustment, and a clamping screw 196 is provided to contact said bearing 194 to lock said stub 195 in adjusted position.

A vertical motor mounting base in the form of a plate 197 is provided and upon this plate the motor 30 is secured at 198. This plate 197 has two integral lateral arms 199 and 200, the free ends of which are pivoted to the free ends of the bracket arms 192 and 193 respectively. This pivoting is preferably accomplished by means of a pivot shaft 201 parallel with the axis of the motor 30.

A short link 202 extends from the plate 197 to the inner end of the stub 195. One end of this link 202 is pivoted to the arm 200 and to a lug 203 (Figure 13) by means of a pin 204. The other end of the link 202 is pivoted to the inner end of the stub 195 by means of a screw 205, spaced radially from the stub axis.

When the clamping screw 196 is loosened, the motor 30 may be pivotally adjusted about the pivot shaft 201, the stub 195 then turning in the bearing 194. Tightening of the clamping screw 196 will frictionally lock the stub 195 and thus lock the motor 30 in adjusted position. Further frictional locking may be accomplished by tightening the screw 205.

Operation

Through the instrumentality of the driving means shown in Figure 12, the cap conveying belt 17, feed turret 20, curing turret 9, discharge turret 25 and timer 24 are driven in timed relation, and it is to be recalled that said timer 24 controls the operation of the plastic discharge gun 19 (Figures 1 and 10) through the instrumentality of the bellows valve 23. The feed turret 20 conveys the unlined caps 21 to the gun 19 which deposits a blob 102 (Figure 1) of plastic in each cap. This feed turret then carries the blob containing caps from the gun 19 to the open clamps 95 of the curing turret 9 as these clamps successively arrive at cap receiving position, the stripper sleeves 104 being then held in raised position by the cam 151. When any open clamp 95 has received a blob containing cap 21, the clamp is immediately closed, causing the die 100 to shape the plastic blob into a liner disk 103 (Figure 1). The die 100 then coacts with the lower clamp member 98 in holding the lined cap while it is being carried by the turret 9 past the burners 157 and 158. These burners maintain the clamp at such a temperature as to cause curing of the liner. The clamps 95 successively open and their strippers 104 descend as they reach the discharge turret 25, and this discharge turret receives the caps with their cured liners 103 (Figure 1) and conveys them to the discharge chute 18 (Figure 1). After any clamp is initially closed, the follow-up pressure exerted by the spring 122, insures such distribution of the plastic in the molding chamber between the die 100 and the cap bottom, that said chamber will be entirely filled and no pockets will therefore exist in the liner disk. As the die 100 is snugly received in the cap skirt, no plastic can "flash out" around said die and become cured to said skirt to interfere with proper engagement of said skirt with a bottle neck or the like.

In case a cap should jam in the feed turret assembly 11, the jam switch 37 is automatically opened to stop the machine. Also, in case of overload from cap jamming or other cause, the switch 50 (Figures 1, 11 and 15 to 17) is automatically opened by the overload clutch 28, to stop the machine.

The locking arm 64 locks the inching means 60, 61, 63 in idle position and release of this locking arm to permit operation of said inching means automatically opens the switch 50, providing an important safety factor.

From the foregoing it will be seen that a novel, rapid and efficiently operable machine has been disclosed for attaining the desired ends. While preferred forms and part arrangements have been disclosed herein it is to be understood that variations in the disclosed forms and part arrangements may be made without departing from the spirit and scope of the invention as defined in the appended claims.

What I claim is:

1. A cap lining machine comprising means for horizontally feeding a succession of inverted unlined caps, fluid plastic discharge means above the line of cap feed for depositing a predetermined quantity of thermo curable fluid plastic onto each cap bottom, a liner curing turret to which the plastic carrying caps are conducted by said feeding means, said turret having circumferentially spaced clamps for the plastic containing caps, each of said clamps having an upper and a lower clamping member mounted for relative vertical movements to clamp open position and to clamp closed position, the upper clamping member of each of said clamps being in the form of a die dimensioned for snug reception in the cap skirt to shape the cap contained plastic into liner disk form on the cap bottom when the clamp is closed, said die being then cooperable with the other of said clamp members in clamping the lined cap to said turret for liner curing, means for driving said turret, means for successively closing the aforesaid clamps as they successively receive the plastic containing caps from said feeding means, means for supplying heat for the lined caps while the latter are held by said clamps and thus at least partially curing the cap liners, means for successively opening said clamps after curing of the liners, means for removing the lined caps from said clamps as the latter are successively opened, means for driving said feeding means in timed relation with said turret, and means for operating said fluid plastic discharge means in timed relation with said feeding means, said feeding means including a feed turret having peripheral pockets for conveying the plastic containing caps to said liner curing turret, a stationary arcuate track at the periphery of said feed turret for holding the caps against radial displacement from said pockets, cap hold down means above said feed turret for holding the caps against upward displacement from said pockets, said cap hold down means including a member upwardly yieldable under the influence of any cap jammed at the initial end of said arcuate track, and machine stopping means operatively connected with said upwardly yieldable member and actuated by upward yielding thereof.

2. In a machine of the class described having a vertical axis turret and a vertically movable clamp operating plunger on said turret; a cylindrical stub rotatably mounted on said turret in downwardly spaced relation with said plunger, said stub being disposed radially of said turret and projecting beyond the periphery of said turret, said stub having an upwardly open recess, a crank pin spanning said recess, a connecting rod connecting said crank pin with the lower end of said plunger, a lateral arm on the outer end of said stub, an abutment stationarily mounted with respect to said turret and cooperable with said lateral arm to turn said stub in clamp opening direction, a second lateral arm on said outer end of said stub, and a second stationary abutment cooperable with said second lateral arm to turn said stub in clamp closing direction.

3. In a machine of the class described, a turret mounted on a vertical axis, said turret having a peripheral projection formed with an opening from its upper to its lower side, an upper clamping member secured upon said projection and having a reduced die forming lower end extending through said opening, and a stripper sleeve slidably surrounding said reduced end within said opening, said stripper sleeve having an operating stem extending through and above said upper clamping member, the upper end of said stem being provided with a lateral projection for coaction with extraneous stripper operating means; together with a clamp block lying upon said turret and said upper clamping member, and threaded means securing said clamp block to said turret, said clamp block having flat vertical guide surfaces for said stem and disposed at opposite sides of the latter, said stem having flat vertical surfaces slidably contacting with said guide surfaces and holding said stem against rotation.

4. In a machine of the class described, a turret having a peripheral projection formed with a cylindrical opening disposed radially of said turret, said projection having a recess from its upper side to said opening, a cylindrical stub rotatably mounted in said opening and having a recess communicating with the aforesaid recess, a plunger operating connecting rod having its lower end received in the recesses of said projection and stub, a crank pin carried by said stub and connecting the latter to said connecting rod, and projecting arms on the outer end of said stub for coaction with extraneous abutments to turn said stub in plunger raising and lowering directions.

5. In a cap conveying means of the general type in which the caps are conveyed by a turret having peripheral cap receiving pockets, and in which a relatively stationary arcuate track holds the caps against radial displacement from said pockets; relatively stationary cap hold down means overlying said turret to hold the caps against upward displacement from said pockets, said cap hold down means including an upwardly yieldable cap hold down and turret stopping member overlying the initial end of said arcuate track and normally biased to cap hold down position, said member being adapted for upward yielding under the upward pressure exerted by a cap jammed at said initial end of said arcuate track and then performing its turret stopping function.

6. A structure as specified in claim 5, in which said upwardly yieldable member carries a normally closed turret stopping switch which is opened by the upward yielding of said member.

7. In a cap conveying means of the general type in which the caps are conveyed by a turret having peripheral cap receiving pockets, and in which a relatively stationary arcuate track holds the caps against radial displacement from said pockets; relatively stationary cap hold down means overlying said turret to hold the caps against upward displacement from said pockets, said cap hold down means including a turret stopping and cap hold down member pivotally mounted over the initial end of said arcuate track, and yieldable means active on said turret stopping and cap hold down member to normally hold it in lowered cap hold down position, said member being adapted for upward swinging under the upward pressure exerted by a cap jammed at said initial end of said arcuate track and then performing its turret stopping function.

8. A structure as specified in claim 7, in which said pivotally mounted turret stopping and cap hold down member carries a normally closed turret stopping switch which is opened by the upward swinging of said member.

9. In a cap conveying means of the general type in which the caps are conveyed over a base plate by a turret having peripheral cap receiving pockets, and in which a relatively stationary arcuate track is secured to said base plate at the periphery of said turret to hold the caps against radial displacement from said pockets; a cap hold down and turret stopping plate overlying said pockets and the initial end of said arcuate track, said turret stopping and cap hold down plate projecting outwardly beyond said arcuate track, means pivotally mounting the outer end of said turret stopping and cap hold down plate upon said base plate to permit upward swinging of the former to a turret stopping position under the influence of a jammed cap, an arm secured to said pivotally mounted plate and projecting beyond the inner end thereof, an a hold down weight carried by said arm to normally hold said pivotally mounted plate yieldably in cap hold down position.

10. A structure as specified in claim 9, in which said pivotally mounted plate carries a normally closed turret stopping switch which is opened by the upward swinging of this plate.

References Cited in the file of this patent
UNITED STATES PATENTS

| | | |
|---|---|---|
| 1,965,732 | Blisterfield | July 10, 1934 |
| 2,058,880 | Hunt | Oct. 27, 1936 |
| 2,117,400 | Cobb | May 17, 1938 |
| 2,235,972 | Zimmerman | Mar. 25, 1941 |
| 2,255,514 | Miller | Sept. 9, 1941 |
| 2,354,029 | Kingston | July 18, 1944 |
| 2,390,882 | Hopkins | Dec. 11, 1945 |
| 2,440,377 | Myers | Apr. 27, 1948 |
| 2,516,908 | Pottle | Aug. 1, 1950 |
| 2,548,304 | Gora | Apr. 10, 1951 |
| 2,570,783 | Farley | Oct. 9, 1951 |
| 2,571,552 | Elderkin et al. | Oct. 16, 1951 |
| 2,588,565 | Pealer | Mar. 11, 1952 |
| 2,654,913 | Maier | Oct. 13, 1953 |
| 2,657,426 | Gora | Nov. 3, 1953 |
| 2,663,908 | Maier et al. | Dec. 29, 1953 |
| 2,672,652 | Howe et al. | Mar. 23, 1954 |
| 2,745,135 | Gora | May 15, 1956 |